(12) United States Patent
Rule et al.

(10) Patent No.: US 7,041,350 B1
(45) Date of Patent: May 9, 2006

(54) POLYESTER COMPOSITION AND ARTICLES WITH REDUCED ACETALDEHYDE CONTENT AND METHOD USING HYDROGENATION CATALYST

(75) Inventors: Mark Rule, Atlanta, GA (US); Yu Shi, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 449 days.

(21) Appl. No.: 10/233,332

(22) Filed: Aug. 30, 2002

(51) Int. Cl.
  *B29D 22/00* (2006.01)
  *C08G 20/00* (2006.01)

(52) U.S. Cl. .................. 428/35.7; 525/437; 525/446; 524/261; 524/403; 524/413; 524/431; 524/442; 428/36.92; 428/221

(58) Field of Classification Search ............... 525/437, 525/446; 524/261, 403, 413, 431, 442; 428/35.7, 428/36.92, 221
See application file for complete search history.

(56) References Cited

U.S. PATENT DOCUMENTS

| | | | |
|---|---|---|---|
| 3,652,493 A | 3/1972 | Stewart | 260/45.7 |
| 3,926,736 A | 12/1975 | Bucolo | 195/103.5 |
| 3,956,324 A | 5/1976 | Jost | 260/368 |
| 4,327,137 A | 4/1982 | Sawa et al. | 428/35 |
| 4,340,453 A | 7/1982 | Noomem | 204/159.15 |
| 4,368,286 A | 1/1983 | Hayashi et al. | 524/394 |
| 4,552,791 A | 11/1985 | Hahn | 428/35 |
| 4,609,721 A | 9/1986 | Kirshenbaum et al. | 528/285 |
| 4,837,115 A | 6/1989 | Igarashi et al. | 428/36.92 |
| 4,840,981 A | 6/1989 | Hasuo et al. | 524/114 |
| 4,886,847 A | 12/1989 | Bastioli et al. | 524/84 |
| 4,894,404 A | 1/1990 | Minnick | 524/226 |
| 5,034,474 A | 7/1991 | Hamilton | 525/446 |
| 5,084,356 A | 1/1992 | Deak et al. | 428/458 |
| 5,085,904 A | 2/1992 | Deak et al. | 428/35.7 |
| 5,102,943 A | 4/1992 | Logullo | 524/487 |
| 5,112,741 A | 5/1992 | Palmer et al. | 435/25 |
| 5,258,233 A | 11/1993 | Mills et al. | 428/480 |

(Continued)

FOREIGN PATENT DOCUMENTS

| | | |
|---|---|---|
| DE | 1 025 142 | 2/1958 |
| EP | 0 450 844 | 10/1991 |
| EP | 0460796 A2 | 12/1991 |
| EP | 0488605 | 6/1992 |
| EP | 0 545 442 A1 | 12/1992 |
| EP | 0 901 102 A2 | 4/1997 |
| JP | 62199648 | 9/1987 |
| JP | 09003179 A | 1/1997 |
| JP | 09003182 A | 1/1997 |
| WO | WO 94/29378 | 12/1994 |
| WO | WO96/04833 | 2/1996 |
| WO | WO 96/35740 | 11/1996 |
| WO | WO97/28218 | 8/1997 |
| WO | WO 98/18848 | 5/1998 |
| WO | WO 98/39388 | 9/1998 |
| WO | WO 00/66659 | 4/2000 |
| WO | WO 01/02489 A1 | 1/2001 |
| WO | WO 01/30900 | 3/2001 |

*Primary Examiner*—Samuel A. Acquah
(74) *Attorney, Agent, or Firm*—Sutherland Asbill & Brennan LLP (57) ABSTRACT

A polyester composition with reduced acetaldehyde concentration comprising polyester, at least one hydrogenation catalyst, and at least one source of reactive hydrogen. A method for making the polyester composition is also disclosed along with polyester articles made with the polyester composition. Suitable articles include containers such as bottles. A packaged beverage comprising a container made with the polyester composition is disclosed.

62 Claims, 2 Drawing Sheets

U.S. PATENT DOCUMENTS

| | | | |
|---|---|---|---|
| 5,266,416 A | 11/1993 | Inoue et al. | 428/651 |
| 5,298,550 A | 3/1994 | Riccardi et al. | 524/513 |
| 5,340,884 A | 8/1994 | Mills et al. | 125/420 |
| 5,364,666 A | 11/1994 | Williams et al. | 427/579 |
| 5,378,510 A | 1/1995 | Thomas et al. | 427/563 |
| 5,389,710 A | 2/1995 | Dege et al. | 524/243 |
| 5,405,921 A | 4/1995 | Muschiatti et al. | 525/444 |
| 5,462,779 A | 10/1995 | Misiano et al. | 428/347 |
| 5,468,520 A | 11/1995 | Williams et al. | 427/560 |
| 5,510,155 A | 4/1996 | Williams et al. | 427/532 |
| 5,531,060 A | 7/1996 | Fayet et al. | 53/426 |
| 5,587,191 A | 12/1996 | Donsbach et al. | 426/66 |
| 5,616,369 A | 4/1997 | Williams et al. | 427/536 |
| 5,650,469 A | 7/1997 | Long et al. | 525/425 |
| 5,656,221 A | 8/1997 | Schumann et al. | 264/85 |
| 5,656,719 A | 8/1997 | Stibal et al. | 528/491 |
| 5,658,628 A | 8/1997 | Ishii et al. | 428/36.92 |
| 5,663,223 A | 9/1997 | Teumac | 524/109 |
| 5,670,224 A | 9/1997 | Izu et al. | 428/35.8 |
| 5,691,007 A | 11/1997 | Montgomery | 427/576 |
| 5,704,983 A | 1/1998 | Thomas et al. | 118/723 |
| 5,837,800 A | 11/1998 | Suzuki et al. | 528/193 |
| 5,856,385 A | 1/1999 | Mehrer et al. | 524/108 |
| 5,874,517 A | 2/1999 | Huang et al. | 528/271 |
| 5,898,058 A | 4/1999 | Nichols et al. | 528/286 |
| 5,922,828 A | 7/1999 | Schiraldi | 528/279 |
| 5,985,389 A | 11/1999 | Dalton et al. | 428/35.7 |
| 6,099,778 A | 8/2000 | Nelson et al. | 264/176.1 |
| 6,160,085 A | 12/2000 | Fujimori et al. | 528/272 |
| 6,191,209 B1 | 2/2001 | Andrews et al. | 524/502 |
| 6,228,447 B1 | 5/2001 | Suzuki et al. | 428/35.7 |
| 6,258,925 B1 | 7/2001 | Dowling et al. | 528/279 |
| 6,274,212 B1 | 8/2001 | Rule et al. | 428/36.92 |
| 6,281,286 B1 | 8/2001 | Chorvath et al. | 524/862 |
| 2002/0032300 A1 | 3/2002 | Dowling et al. | 528/272 |
| 2002/0094402 A1 | 7/2002 | Jen | 428/36.92 |

POLYESTER COMPOSITION AND ARTICLES WITH REDUCED ACETALDEHYDE CONTENT AND METHOD USING HYDROGENATION CATALYST

FIELD OF INVENTION

The present invention relates to a method of decreasing the acetaldehyde content of melt-processed polyesters by incorporation into the polyester a hydrogenation catalyst and a source of hydrogen.

BACKGROUND OF INVENTION

Polyesters, especially poly(ethylene terephthalate) (PET) are versatile polymers that enjoy wide applicability as fibers, films, and three-dimensional structures. A particularly important application for PET is for containers, especially for food and beverages. This application has seen enormous growth over the last 20 years, and continues to enjoy increasing popularity. Despite this growth, PET has some fundamental limitations that restrict its applicability. One such limitation is its tendency to generate acetaldehyde (AA) when it is melt processed. Because AA is a small molecule, AA generated during melt processing can migrate through the PET. When PET is processed into a container, AA will migrate over time to the interior of the container. Although AA is a naturally occurring flavorant in a number of beverages and food products, for many products the taste imparted by AA is considered undesirable. For instance, AA will impart a fruity flavor to water, which detracts from the clean taste desired for this product.

PET is traditionally produced by the transesterification or esterification/polymerization of a terephthalate precursor (either dimethyl terephthalate or terephthalic acid) and ethylene glycol. If the end use application for the melt-polymerized PET is for food packaging, the PET is then subject to a second operation known as solid-state polymerization (SSP), where the molecular weight is increased and the AA generated during melt polymerization is removed. A widely used method to convert the SSP PET into containers consists of drying and remelting the PET, injection molding the polymer into a container precursor (preforms), and subsequently stretch blow-molding the preform into the final container shape. It is during the remelting of the PET to fashion the container preforms that AA is regenerated. Typical preform AA levels for PET processed in the most modern injection molding equipment is 6–8 ug/g (ppm).

Historically, the impact of AA on product taste has been minimized by careful control of the melt processing conditions used to make containers or preforms, and by use of special processing conditions in polymer preparation. This approach is successful for most products where the taste threshold for AA is sufficiently high, or where the useful life of the container is sufficiently short However, obtaining low AA carries with it a significant cost. That cost includes the need to carry out a separate processing step after the melt polymerization of PET (solid-state polymerization), the need for specially designed injection molding equipment, and the need to continually monitor the AA content during container production For other applications, where the desired shelf-life of the container is longer, the product is more sensitive to off-taste from AA, or the prevailing environmental conditions are warmer, it is not possible to keep the AA level below the taste threshold by using these methods. For example, in water, the taste threshold is considered to be less than about 40 ug/L (ppb), and often a shelf-life of up to two years is desired. For a PET bottle that contains 600 ml of beverage, a preform AA content of 8 ppm can result in a beverage AA level greater than 40 ppb in as little as one month. For these reasons, there has been considerable efforts directed toward developing technologies to minimize the AA generated during melt processing of PET and other polyesters.

In addition to careful control of melt-processing conditions for PET, prior art methods include modifications to the injection molding process to minimize the thermal and shear heating of the PET; use of lower IV (intrinsic viscosity) resins, and the use of lower melting PET resins. Each of these approaches has been only partially successful, and each suffer from their own limitations. For example, specially designed injection molding equipment entail higher capital cost for the equipment. Lower IV resins produce containers that are less resistant to environmental factors such as stress crack failure. Lower melting resins are achieved by increasing the copolymer content the PET resin. However, increasing the copolymer content also increases the stretch ratio of the PET, which translates into decreased productivity in injection molding and blow molding.

Another prior art approach has been to incorporate additives into PET that will selectively react with, or scavenge, the AA that is generated. Thus Igarashi (U.S. Pat. No. 4,837,115) claims the use of amine-group terminated polyamides and amine-group containing small molecules. Igarashi teaches that the amine groups are effective because they can react with AA to form imines, wherein the amine nitrogen forms a double bond with the AA moiety. Igarashi teaches that essentially any amine is effective. Mills (U.S. Pat. Nos. 5,258,233; 5,650,469; and 5,340,884) and Long (U.S. Pat. No. 5,266,416) claim the use of various polyamides, especially low molecular weight polyamides. Turner and Nicely (WO 97/28218) claim the use of polyesteramides. These polyamides and polyesteramides are believed to react with AA in the same manner as described by Igarashi. Imine formation is almost always accompanied by the formation of a yellow color, which is undesirable in many polyester products. U.S. Pat. No. 6,274,212 describes a class of AA scavengers that sequester AA by forming cyclic 5 or 6-member ring compounds, and have a much reduced tendency to form color.

While these prior art AA scavengers are effective at reducing the AA content of melt-processed PET, they all rely on the stoichiometric reaction of acetaldehyde with a sequestering reagent. In addition, in all of these prior art AA scavengers, the sequestering reaction is an equilibrium reaction. Consequently, in all cases a significant excess of the AA scavenger must be employed. Moreover, once the capacity of the reagent is exhausted, any additional AA formed cannot be sequestered. Consequently, while reasonable levels of these reagents can be effective at decreasing the AA generated during melt-processing of SSP resin, the amount needed to afford a similar decrease in melt-phase (non-solid state polymerized) resin is uneconomical. It would therefore be an advance in the state of the art to develop a process for decreasing the AA content of melt-processed polyesters that does not suffer from these prior art limitations.

Therefore, there is a need for an improved method to reduce the migration of acetaldehyde from polyester containers into beverages.

SUMMARY OF INVENTION

It is therefore desirable to provide a catalytic method to decrease the acetaldehyde content of melt-processed polyesters. It is preferable to decrease the acetaldehyde content of melt-processed polyesters by an irreversible reaction. It is also preferable to provide a method for decreasing the acetaldehyde content of polyesters which is low cost and does not create significant off-color. In addition, it is preferable to provide a method to decrease the acetaldehyde content of melt-polymerized polyester resin to acceptable levels and at a reasonable cost.

The present invention relates to a method to substantially decrease the acetaldehyde content of melt-processed polyesters which contain ethylene linkages, especially PET, by the incorporation of low levels of one or more hydrogenation catalysts into the polyester and providing a source of hydrogen. The hydrogenation catalysts can be selected from all the known hydrogenation catalysts. The source of hydrogen can be any source of reactive hydrogen, including hydrogen gas. Because the hydrogenation reaction is catalytic, the amount of hydrogenation catalyst added can be much lower than the amount of acetaldehyde present. In addition, because the hydrogenation reaction is irreversible, it can be carried to completion, regardless of the amount of acetaldehyde present, as long as sufficient reactive hydrogen is provided.

More particularly, the present invention encompasses a method of decreasing acetaldehyde in polyester by incorporating a hydrogenation catalyst and a source of reactive hydrogen into a polyester. The present invention also encompasses a polyester composition comprising polyester, a hydrogenation catalyst, and a source of reactive hydrogen. The polyester may be polyethylene terephthalate or polyethylene naphthalate or the like. Suitable hydrogenation catalysts include the Group VIII metals and metal hydrides and the like. Suitable sources for hydrogen include molecular hydrogen and silicon hydrides and the like.

In addition, the present invention encompasses articles, such as containers, made with the foregoing polyester composition and the method of making such articles. The present invention is particularly suited in the manufacture of beverage containers such as PET bottles for packaged beverages. Thus, the present invention encompasses a bottled beverage comprising the polyester-based container of this invention and a beverage in the container, and a method for making the packaged beverage. The container of this invention is particularly suited for packaging water because the reduced acetaldehyde content preserves a fresh, clean water taste.

According to one embodiment of this invention, a method of producing a polyester article comprises the steps of preparing a polyester melt, adding a hydrogenation catalyst, adding a source of reactive hydrogen, and, forming the polyester article. Optionally, the polyester melt is subject to a vacuum prior to adding the source of reactive hydrogen. It is not necessary to solidify the polyester melt prior to forming the polyester article. A suitable article made according this embodiment is a polyester container preform.

Other objects features and advantages of this invention will become apparent to those skilled in the art upon understanding the foregoing detailed description and accompanying drawings.

DETAILED DESCRIPTION

As summarized above, the methods of the present invention provide a process of reducing or eliminating acetaldehyde in polyester. By reducing the amount of acetaldehyde in the polyester, the potential for off-taste from the polyester is decreased.

Generally, the present invention encompasses a method of decreasing acetaldehyde in polyester by incorporating a hydrogenation catalyst and a source of reactive hydrogen into a polyester. The present invention also encompasses a polyester composition comprising polyester, a hydrogenation catalyst, and a source of reactive hydrogen. In addition, the present invention encompasses articles, such as containers, made with the foregoing polyester composition, the method of making such articles, a bottled beverage comprising a polyester-based container and a beverage in the container, and a method for making the packaged beverage.

Examples of hydrogenation catalysts effective for the present invention include the Group VIII metals, including elemental nickel, cobalt, palladium, ruthenium, rhodium, platinum, osmium, and iridium. Of these catalysts elemental nickel is preferred, due to its low cost and effectiveness. Generally, these Group VIII catalysts are in zero valent form. The Group VIII metals can be added either as finely divided metal particles alone or supported on solid catalyst carriers, or as higher-valent precursor compounds such as palladium acetate. In addition, a number of other less traditional hydrogenation catalysts are also effective. Examples of other effective catalysts include tin hydrides, germanium hydrides, rare earth hydrides, and titanium hydrides. Of these less traditional hydrogenation catalysts, tin and titanium hydrides are preferred because they can be generated in situ by reaction of higher-valent tin or titanium compounds with sources of reactive hydrogen.

Sources for hydrogen preferred in the present invention include molecular hydrogen and silicon hydrides. Molecular hydrogen can be readily incorporated into a polyester melt by adding hydrogen gas into the polymer melt. Molecular hydrogen can also be incorporated into solid polyester articles, such as pellets, simply by exposing the solid polyester article to hydrogen gas; the high rate of diffusion of hydrogen causes it to rapidly permeate throughout the polyester.

Silicon hydrides suitable as sources of reactive hydrogen include triethylsilane, triethoxysilane, tetramethyldisiloxane, and poly(methylhydro)siloxane. Of these silicon hydrides, poly(methylhydro)siloxane is preferred, because it is liquid at room temperature, nonvolatile, low cost, thermally stable, and can be readily incorporated into polyesters via traditional melt blending techniques. When a silicon hydride is utilized as the hydrogen source, suitable catalysts for the hydrogenation reaction includes Bronsted acids, Bronsted bases, Lewis acids, Lewis bases, and fluoride ion, in addition to the other hydrogenation catalysts discussed above. These additional catalysts are effective because of their ability to activate silicon hydrides toward hydride donation to unsaturated compounds, especially toward carbonyl groups.

The amount of hydrogenation catalyst necessary to substantially reduce the amount of acetaldehyde present in a polyester matrix depends on the reaction temperature, the reaction time, and the amount of hydrogen source available. In the present invention, any amount of hydrogenation catalyst can be utilized that achieves the intended effect. Preferred amounts are less that 100 ppm, and more preferred amounts are less than about 50 ppm. The amount of hydrogenation catalyst in the polyester desirably ranges from about 0.1 ppm to about 100 ppm, and preferably range from about 5 ppm to about 50 ppm. The amount of reactive hydrogen present is desirably from about 1 to about 50 times more than the amount of acetaldehyde present.

The method of incorporation of the hydrogenation catalyst and the source of reactive hydrogen into polyesters is not critical. The hydrogenation catalyst can be incorporated into the polyester at any time prior to, during, or after the introduction of the hydrogen source. The catalyst can be incorporated during esterification or melt polymerization. In other words, the hydrogenation catalyst may be added to the polyester during original formation of the polyester or during subsequent melt-processing of the polyester. It can be incorporated by spraying a slurry of the catalyst onto the polyester pellets prior to or after solid state polymerization or drying. It can be incorporated by injection of a melt, solution, or suspension of the catalyst into pre-melted polyester. It may also be incorporated by making a masterbatch of the catalyst with polyester and then mixing the masterbatch pellets with polyester pellets at the desired level before drying and injection molding or extrusion.

The source of reactive hydrogen can be incorporated at any time before, during, or after the addition of the hydrogenation catalyst. Preferably, the hydrogen source is added immediately prior to quenching the molten polyester, although if the hydrogen source is molecular hydrogen, it can be added after quenching the molten polyester by exposing the solid polyester article to hydrogen gas. One preferred embodiment is to add the hydrogenation catalyst to the molten polyester during injection molding, and simultaneously adding the source of reactive hydrogen. In another preferred embodiment, the hydrogenation catalyst is added to the polyester during or before melt polymerization, and the hydrogen source is added just before injection molding or extrusion.

The polyesters that the present invention are effective for can be broadly described as polyesters that contain an ethylene linkage. Polyesters that include such a linkage include poly(ethylene terephthalate), poly(ethylene naphthalate), poly(ethylene adipate), poly(ethylene isophthalate), and blends or copolymers of the same. Additional glycol linkages that may be present as comonomers include cyclohexanedimethanol, diethylene glycol 1,2-propanediol, neopentylene glycol, 1,3-propanediol, and 1,4butanediol.

The most preferred polyesters are PET and derivatives thereof. PET is a high molecular weight condensation polymer. Preferably, PET as used herein means a polyester having an acid component and a glycol component, and having repeat units of at least 85 mol % terephthalic acid and at least 85 mol % ethylene glycol. More preferably, PET as used herein means a polyester repeat units of at least 95 mol % terephthalic acid and at least 95 mol % ethylene glycol. PET is currently produced in large volumes for three major markets: fiber, bottle resin, and film. Although PET is effectively the same polymer for all three markets, some of its properties can be modified by additives and changes in molecular weight, and all producers of PET tailor their product, to the extent practical, to optimize downstream processing and final performance properties for the specific application.

The polymerization catalyst used for the present invention is not critical. Suitable polymerization catalysts include antimony, titanium, germanium, gallium, and tin compounds. Of these, antimony is somewhat less preferred, because under some conditions reduction of the antimony catalyst to antimony metal can compete with the hydrogenation of acetaldehyde. Thus, in one embodiment, the polyester is desirably free of antimony. A preferred polymerization catalyst is titanium, because it is very active for polymerization when it is in the +4 oxidation state, and is active for hydrogenation upon addition of sources of reactive hydrogen, which reduce the titanium(IV) alkoxides to titanium hydride species.

The method of eliminating acetaldehyde as disclosed in the present invention is applicable to any type of polyester-based container used to transport or store beverages. Suitable containers include, but are not limited to, bottles, drums, carafes, coolers, etc. Thus, according to one embodiment of the present invention, a bottled beverage is provided in a polyester-based container, wherein the polyester-based container comprises a hydrogenation catalyst and a source of reactive hydrogen. Still another embodiment of this invention is a container preform made from the polyester composition of this invention. A beverage container can then be made with the preform by conventional means. The hydrogenation catalyst and source of reactive hydrogen can be added to the polyester during original formation of the PET or during subsequent manufacture of preforms from PET pellets. The preforms can be made by melt-processing PET pellets or by immediately melt-processing the PET during original formation or synthesis of the PET without the intermediate step of forming PET pellets or otherwise solidifying the PET prior to forming the preform. In this embodiment, it is anticipated that the polyester can be produced by melt-phase polymerization to the desired molecular weight, and is then directly transformed into the shaped article. In this embodiment, addition of the hydrogenation catalyst will occur prior to formation of the shaped article, while the hydrogen source can be added either before, during, or after formation of the shaped article.

The present invention is useful in preventing the migration of acetaldehyde from polyester containers into any type of beverage in order to prevent off-taste of the beverage from occurring. Depending upon the type of beverage being used, the taste threshold of acetaldehyde may vary. However, it is preferred that the concentration of acetaldehyde in the beverage be decreased to approximately less than 40 ppb. More preferably, the concentration of acetaldehyde in the beverage is decreased to less than 20 ppb.

As indicated above, the present invention may be used to improve the taste of any type of beverage including, but not limited to water, colas, sodas, alcoholic beverages, juices, etc. However, it is particularly useful for preventing the off-taste of sensitive products such as water.

This invention encompasses articles made with the described polyester compositions. In preferred embodiments, the articles of this invention include items such as containers and container preforms. Suitable containers include bottles, drums, carafes, and coolers, and the like. As is well known to those skilled in the art, such containers can be made by blow molding an injection molded preform. Examples of suitable preform and container structures and methods for making the same are disclosed in U.S. Pat. No. 5,888,598, the disclosure of which is expressly incorporated herein by reference in its entirety.

Figure 1:
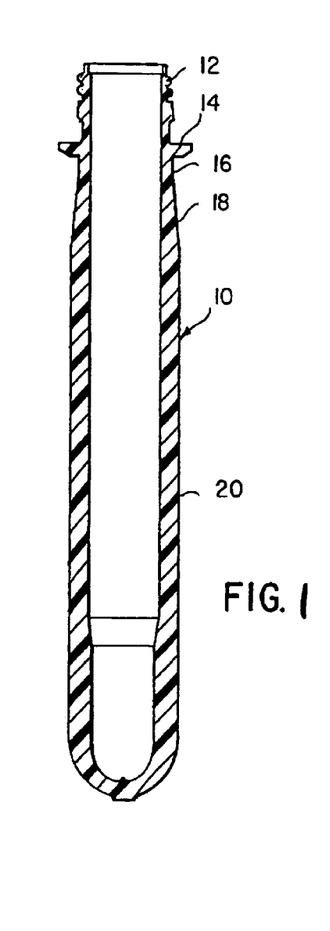
FIG. 1 is a sectional elevation view of an injection molded container preform made in accordance with a preferred embodiment of this invention.

Turning to FIG. 1, a polyester container preform 10 is illustrated. This preform 10 is made by injection molding polyester compositions of this invention and comprises a threaded neck finish 12 which terminates at its lower end in a capping flange 14. Below the capping flange 14, there is a generally cylindrical section 16 which terminates in a section 18 of gradually increasing external diameter so as to provide for an increasing wall thickness. Below the section 18 there is an elongated body section 20.

Figure 2:
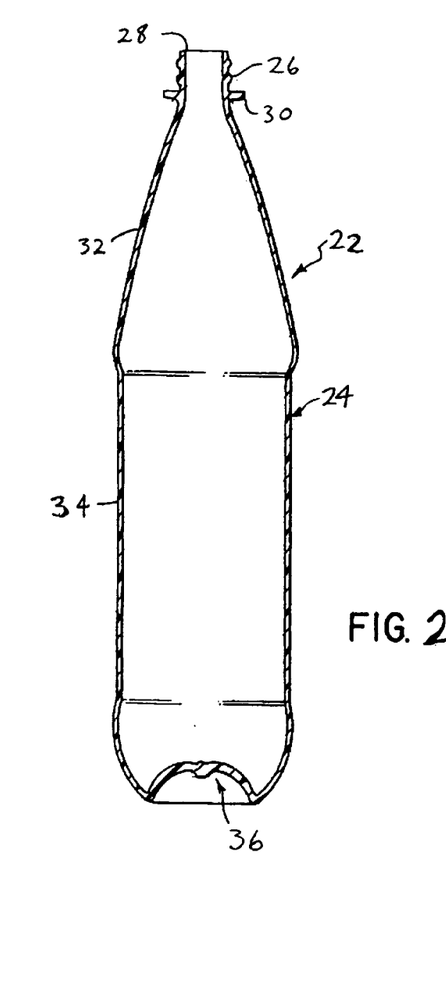
FIG. 2 is a sectional elevation view of a blow molded container made from the preform of FIG. 1 in accordance with a preferred embodiment of this invention.
Figure 3:
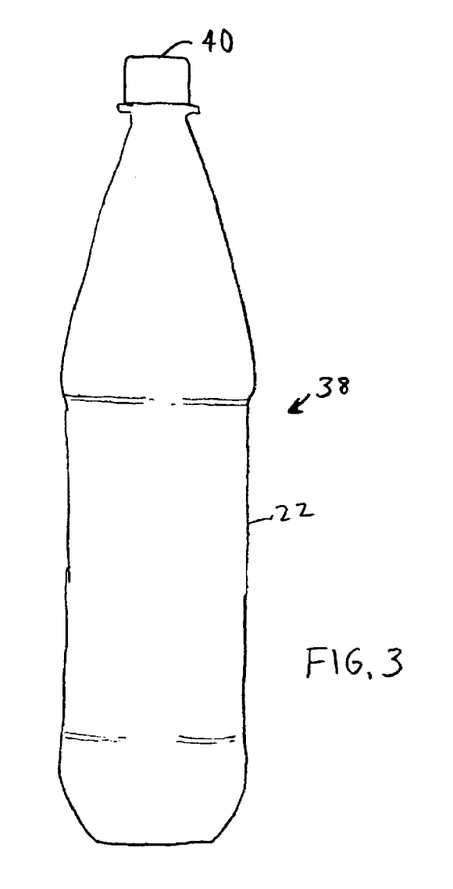
FIG. 3 is a perspective view of a packaged beverage made in accordance with a preferred embodiment of this invention.

The preform 10 illustrated in FIG. 1 can be blow molded to form a container 22 illustrated in FIG. 2. The container 22 comprises a shell 24 comprising a threaded neck finish 26 defining a mouth 28, a capping flange 30 below the threaded neck finish, a tapered section 32 extending from the capping flange, a body section 34 extending below the tapered section, and a base 36 at the bottom of the container. The container 10 is suitably used to make a packaged beverage 38, as illustrated in FIG. 3. The packaged beverage 38 includes a beverage such as a carbonated soda beverage disposed in the container 22 and a closure 40 sealing the mouth 28 of the container.

The preform 10, container 22, and packaged beverage 38 are but examples of applications using the compositions of the present invention. It should be understood that the compositions of the present invention can be used to make a variety of articles and preforms and containers having a variety of configurations.

Acetaldehyde scavengers can also be added to the polyester composition of this invention. They can be added prior to or after adding the source of reactive hydrogen. U.S. Pat. No. 6,274,212, the disclosure of which is expressly incorporated herein by reference, describes a class of AA scavengers that sequester AA by forming cyclic 5 or 6-member ring compounds.

The present invention is described above and ferer illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or scope of the appended claims. In addition, it should be understood that use of the designation IV in the Examples means intrinsic viscosity as measured by ASTM D 4603-96.

EXAMPLES

The following examples, with the exception of Examples 10, 16, 22, 23, 28, 31, 32, and 34 (comparative examples) illustrate the use of the present invention for decreasing the acetaldehyde content of melt-processed PET. In these examples, the acetaldehyde content was determined by taking a representative portion of the melt-processed polyester, grinding to pass a 2 mm screen, and desorbing the contained acetaldehyde from the polyester by heating at 150 deg C. for 45 minutes in a sealed vial. The desorbed acetaldehyde was then analyzed using a gas chromatograph equipped with a flame ionization detector. Beverage acetaldehyde levels were determined by removing a 5 ml aliquot of the beverage, placing the aliquot into a 20 ml vial, adding 1 gram of sodium chloride, and desorbing the contained acetaldehyde at 80 deg C. for 30 minutes, followed by analysis of the beverage headspace using a gas chromatograph equipped with a flame ionization detector. Headspace acetaldehyde was determined by capping a freshly blow-molded container, storing for 24 hours at 22 deg C., and measuring the acetaldehyde content of the contained air by gas chromatography.

Examples 1–4

In the following examples, PET 8006 pellets (from Shell Chemical) were dried in a vacuum oven to between 50 and 100 ppm residual moisture. The selected hydrogenation catalysts and poly(methylhydro)siloxane (PMHSO) were suspended in mineral oil, and were coated onto the PET pellets by tumbling. The resulting coated PET pellets were extruded at 265 deg C. through a ¾ inch single screw extruder. The total residence time for extrusion was 90 seconds. The resulting extruded PET was quenched in water. After 30 minutes of continuous extrusion, a portion of the extruded PET was isolated, ground, and subjected to analysis for AA content. The results below are reported as % decrease in AA content vs. a PET control containing the same amount of mineral oil. In all cases the mineral oil content was 0.2%. The equation for calculating the percent decrease in acetaldehyde (AA) content is as follows:

Percent decrease=(*AA* content control–*AA* content test material)/(*AA* control))×100

| Example No. | Catalyst | Ppm Catalyst | Ppm PMHSO | % AA Decrease |
|---|---|---|---|---|
| 1 | Pd black | 1 | 100 | 14.4 |
| 2 | Pd black | 1 | 500 | 21.3 |
| 3 | Pd black | 10 | 500 | 30.9 |
| 4 | Pd black | 5 | 250 | 23.8 |

Examples 5–9

In the following examples, PET 8750 pellets (from Teijin) containing (50 ppm germanium as a polycondensation catalyst) were dried in a vacuum oven to between 50 and 100 ppm residual moisture. The selected hydrogenation catalysts and poly(methylhydro)siloxane (PMHSO) were suspended in mineral oil, and were coated onto the PET pellets by tumbling. The resulting coated PET pellets were extruded at 510 deg F. through a ¾ inch single screw extruder. The total residence time for extrusion was 90 seconds. The resulting extruded PET was quenched in water. After 30 minutes of continuous extrusion, a portion of the extruded PET was isolated, ground, and subjected to analysis for acetaldehyde content.

The results below are reported as % decrease in acetaldehyde content vs. a PET control containing the same amount of mineral oil. In all cases the mineral oil content was 0.2%. The same equation for calculating the percent decrease in acetaldehyde (AA) content was used as before.

| Example No. | Catalyst | Ppm Catalyst | Ppm PMHSO | % AA Decrease |
|---|---|---|---|---|
| 5 | Pd black | 10 | 500 | 52.0 |
| 6 | Raney Ni | 10 | 500 | 23.2 |
| 7 | Nickel Boride | 50 | 500 | 28.6 |
| 8 | Dibutyltin dilaurate | 50 | 500 | 36.3 |
| 9 | Dibutyltin dilaurate | 250 | 500 | 33.2 |

Examples 10–15

In the following examples, 24 gram preforms were molded on a unit-cavity Arburg press. The molding temperature was 268 deg C., the cycle time was 29 seconds, and the total melt residence time was 180 seconds. A PET resin containing 10 ppm titanium as a polycondensation catalyst was dried overnight at 150 deg C. to less than 50 ppm moisture, and was then cooled to room temperature in a vacuum oven. The indicated amounts of hydrogenation catalyst and poly(methylhydro)siloxane (PMHSO) were added to the pellets and dispersed by agitation. Preforms were measured for preform acetaldehyde content, and blown bottles were measured for color and headspace acetaldehyde.

| Example No. | Catalyst | Ppm Catalyst | Preform Ppm PMHSO | AA (ppm) | Bottle Headspace AA (ug/L) | Color (b*) |
|---|---|---|---|---|---|---|
| 10 | — | — | — | 14.4 | 4.92 | 3.18 |
| 11 | Nickel Boride | 48 | 500 | 4.30 | 1.47 | 3.01 |
| 12 | Pd black | 25 | 500 | 4.90 | 1.37 | 3.12 |
| 13 | Dibutyltin dilaurate | 25 (as Sn) | 500 | 8.53 | 3.03 | 3.24 |
| 14 | Tin (II) dioctoate | 20 (as Sn) | 500 | 9.73 | 3.25 | 3.32 |
| 15 | Nickel boride | 80 | 500 | 4.07 | 1.46 | 3.11 |

The bottles from Examples 10–15 were filled with carbonated water and were stored at 22 deg C. The contents of the bottles were sampled over a period of eight weeks to monitor the amount of AA present in the water over time. Those results are presented in the table below:

| Example No. | Catalyst | Ppm Catalyst | Ppm PMHSO | Beverage AA after 1 week (ppb) | Beverage AA after 2 weeks (ppb) | Beverage AA after 8 weeks (ppb) |
|---|---|---|---|---|---|---|
| 16 | — | — | — | 40.9 | 57.5 | 101.3 |
| 17 | Nickel Boride | 48 | 500 | 16.6 | 22.5 | 36.2 |
| 18 | Pd black | 25 | 500 | 19.1 | 23.3 | 29.1 |
| 19 | Dibutyltin dilaurate | 25 (as Sn) | 500 | ND | ND | ND |
| 20 | Tin (II) dioctoate | 20 (as Sn) | | 37.2 | 58.2 | 65.9 |
| 21 | Nickel boride | 80 | 500 | 17.1 | 23.6 | 37.5 |

Examples 22–27

In the following examples, a 0.87 IV PET resin containing 10 ppm Ti as a catalyst was dried and injection molded at 285 deg C. in an Arburg single-cavity press, using a 24 gram preform mold. The cycle time for the injection molding was 30 seconds, and the total residence time was about 200 seconds. The Ni—B was added as nickel boride powder, the Ru was added as ruthenium black, and the Sn was added as tin(II) dioctoate. The ppm catalyst and preform AA content are recorded below:

| Example No. | Added Hydrogenation catalyst | ppm catalyst | Hydrogen source | ppm Hydrogen source | Preform AA | Percent AA reduction |
|---|---|---|---|---|---|---|
| 22 | — | — | — | — | 26.50 | 0 |
| 23 | — | — | PMHSO | 500 | 19.25 | 27.4 |
| 24 | Ni-13 B | 100 | PMHSO | 500 | 18.05 | 31.9 |
| 25 | Ru | 0.1 | PMHSO | 500 | 17.42 | 34.3 |
| 26 | Ru | 1.0 | PMHSO | 500 | 14.68 | 44.6 |

-continued

| Example No. | Added Hydrogenation catalyst | ppm catalyst | Hydrogen source | ppm Hydrogen source | Preform AA | Percent AA reduction |
|---|---|---|---|---|---|---|
| 27 | Sn | 25 | PMHSO | 500 | 17.67 | 33.3 |

Example 23, above, clearly shows that titanium itself is active as a hydrogenation catalyst. Examples 24–27 demonstrate the additional degree of hydrogenation achieved by use of titanium plus an additional hydrogenation catalyst.

Examples 28–30

In the following examples, a 0.80 IV PET resin containing 18 ppm Ti as a polymerization catalyst was injection molded at 280 deg C. with a 30 second cycle time in an Arburg single-cavity press, using a 24 gram preform mold. 0, 100, or 500 ppm PMHSO was added as the source of reactive hydrogen. These examples demonstrate that even relatively low levels of a reactive hydrogen source are effective in reducing the amount of AA present in melt-processed PET.

| Example No. | Process Temperature | Cycle Time | Hydrogen source | ppm Hydrogen source | Preform AA | Percent AA reduction |
|---|---|---|---|---|---|---|
| 28 | 280 | 30 | — | — | 11.13 | 0 |
| 29 | 280 | 30 | PMHSO | 100 | 5.98 | 46.3 |
| 30 | 280 | 30 | PMHSO | 500 | 4.54 | 59.2 |

Examples 31–36

In the following examples, 0.80 IV PET resins made using either germanium or titanium as a polymerization catalysts were injection molded at 280 deg C. with a 30 second cycle time in an Arburg single-cavity press, using a 24 gram preform mold. Hydrogen gas was provided (as a 10% $H_2/N_2$ mixture at 50 psig) to the polymer melt via a vent port located one-half the distance between the inlet and outlet of the barrel.

| Example No. | Polymerization catalyst | ppm 5% Pd—C (ppm Pd) | H$_2$/N$_2$ pressure (psi) | Preform AA | Percent AA reduction |
|---|---|---|---|---|---|
| 31 | Ge | 0 | 0 | 8.25 | 0 |
| 32 | Ge | 40 (2) | 0 | 8.04 | 2.5 |
| 33 | Ge | 40 (2) | 50 | 6.71 | 18.6 |
| 34 | Ti | 0 | 0 | 9.55 | 0 |
| 35 | Ti | 0 | 50 | 8.44 | 11.6 |
| 36 | Ti | 40 (2) | 50 | 4.96 | 48.0 |

These examples demonstrate the use of hydrogen gas as a hydrogen source for the reduction of acetaldehyde in melt-processed PET.

Example 37

In the following example, a polyester resin is prepared via melt-phase polycondensation to an IV of approximately 0.80 dl/g. The molten polymer is then transferred from the polymerization reactor via a heated transfer line to an injection mold. In the transfer line, a hydrogenation catalyst and hydrogen gas is added. The molten polymer is then forced into the injection mold, and the part formed is removed after cooling to the solid state. The formed part has a reduced amount of acetaldehyde in the polymer matrix relative to the amount that would be present in the absence of the addition of the hydrogenation catalyst and the reactive hydrogen.

These and other examples demonstrate the effectiveness of hydrogenation to decrease the acetaldehyde content on polyesters that have been subject to melt processing.

It should be understood that the foregoing relates to particular embodiment of the present invention, and that numerous changes may be made therein without departing from the scope of the invention as defined by the following claims.

We claim:

1. A method of reducing the amount of acetaldehyde in a melt-processed polyester, the method comprising adding to the polyester at least one hydrogenation catalyst and at least one source of reactive hydrogen.

2. A method as in claim 1, wherein the melt-processed polyester-based is a polyethylene terephthalate.

3. A method as in claim 1, wherein the hydrogenation catalyst is a Group VIII metal.

4. A method as in claim 1, wherein the hydrogenation catalyst is zero valent nickel.

5. A method as in claim 1, wherein the hydrogenation catalyst is zero valent palladium.

6. A method as in claim 1, wherein the hydrogenation catalyst is a zero valent platinum.

7. A method as in claim 1, wherein the hydrogenation catalyst is a metal hydride.

8. A method as in claim 1, wherein the hydrogenation catalyst is a tin hydride.

9. A method as in claim 1, wherein the hydrogenation catalyst is a titanium hydride.

10. A method as in claim 1, wherein the hydrogenation catalyst is generated in situ by reaction of a catalyst precursor with a source of reactive hydrogen.

11. A method as in claim 1, wherein the source of reactive hydrogen is molecular hydrogen.

12. A method as in claim 1, wherein the source of reactive hydrogen is a silicon hydride.

13. A method as in claim 1, wherein the source of reactive hydrogen is poly(methylhydro)siloxane.

14. A method as in claim 13 wherein the hydrogenation catalyst is selected from the group consisting of Bronsted acids, Bronsted bases, Lewis acids, Lewis bases, and fluoride ion.

15. A method as in claim 1, further comprising melt-processing the polyester, wherein the hydrogenation catalyst is added to the polyester prior to the melt-processing.

16. A method as in claim 1, further comprising melt-processing the polyester, wherein the source of reactive hydrogen is added to the polyester prior to the melt-processing.

17. A method as in claim 1, further comprising melt-processing the polyester, wherein the source of reactive hydrogen is added to the polyester after the melt-processing.

18. A method as in claim 1, wherein the hydrogenation catalyst is present in the polyester in the amount of 0.1–100 ppm.

19. A method as in claim 1, wherein the hydrogenation catalyst is present in the polyester in the amount of 5–50 ppm.

20. A composition comprising:
a polyester;
at least one hydrogenation catalyst; and
at least one source of molecular hydrogen.

21. A composition as in claim 20, wherein the polyester is polyethylene terephthalate, polyethylene naphthalate, or a PET/PEN blend.

22. A composition as in claim 20, wherein the hydrogenation catalyst is a Group VIII metal.

23. A composition as in claim 20, wherein the hydrogenation catalyst is zero valent nickel.

24. A composition as in claim 20, wherein the hydrogenation catalyst is zero valent palladium.

25. A composition as in claim 20, wherein the hydrogenation catalyst is zero valent platinum.

26. A composition as in claim 20, wherein the hydrogenation catalyst is a metal hydride.

27. A composition as in claim 20, wherein the hydrogenation catalyst is a tin hydride.

28. A composition as in claim 20, wherein the hydrogenation catalyst is a titanium hydride.

29. A composition as in claim 20, wherein the source of reactive hydrogen is molecular hydrogen.

30. A composition as in claim 20, wherein the source of reactive hydrogen is a silicon hydride.

31. A composition as in claim 20, wherein the source of reactive hydrogen is poly(methylhydro)siloxane.

32. A composition as in claim 20 wherein the hydrogenation catalyst is selected from the group consisting of Bronsted acids, Bronsted bases, Lewis acids, Lewis bases, and fluoride ion.

33. A composition as in claim 20, wherein the hydrogenation catalyst is present in the amount of 0.1–100 ppm.

34. A composition as in claim 20, wherein the hydrogenation catalyst is present in the amount of 5–50 ppm.

35. A method for making a polyester article comprising:
adding to polyester at least one hydrogenation catalyst and at least one source of reactive hydrogen; and
forming the polyester into an article.

36. A method as in claim 35, wherein the polyester is polyethylene terephthalate, polyethylene naphthalate, or a PET/PEN blend.

37. A method as in claim 35, wherein the article is a container.

38. A method as in claim 37, wherein the container is a bottle, drum, carafe or cooler.

39. A method as in claim 35, wherein the article is a container preform.

40. A method as in claim 35, wherein the container is made by melt-processing and the hydrogenation catalyst is added to the polyester prior to the melt-processing.

41. A method as in claim 35, wherein the hydrogenation catalyst is present in the amount of 0.1–100 ppm.

42. A method as in claim 35, wherein the hydrogenation catalyst is present in the amount of 5–50 ppm.

43. A polyester-based article formed from a composition comprising polyester, at least one hydrogenation catalyst, and at least one source of molecular hydrogen.

44. A polyester-based article as in claim 43, wherein the polyester is polyethylene terephthalate, polyethylene naphthalate, or a PET/PEN blend.

45. A polyester-based article as in claim 43, wherein the article is a container.

46. A polyester-based article as in claim 45, wherein the container is a bottle, drum, carafe or cooler.

47. A polyester-based article as in claim 43, wherein the article is a container preform.

48. A polyester-based article as in claim 43, wherein the article is a film.

49. A polyester-based article as in claim 43, wherein the hydrogenation catalyst is present in the amount of 0.1–100 ppm.

50. A polyester-based article as in claim 43, wherein the hydrogenation catalyst is present in the amount of 5–50 ppm.

51. A method for reducing acetaldehyde in a bottled beverage comprising:

adding to polyester at least one hydrogenation catalyst and at least one source of reactive hydrogen;

forming the polyester into a container;

filling the container with a beverage; and sealing the container.

52. A method as in claim 51, wherein the beverage is water.

53. A bottled beverage comprising:

a polyester-based container formed from a composition comprising polyester, at least one hydrogenation catalyst, and at least one source of reactive hydrogen; and a beverage in the polyester-based container.

54. A bottled beverage as in claim 53, wherein the polyester-based container is a polyethylene terephthalate container.

55. A bottled beverage as in claim 53, wherein the beverage is water.

56. A bottled beverage as in claim 53, wherein the concentration of acetaldehyde in the beverage is less than 40 ppb.

57. A method of reducing acetaldehyde in a polyester article comprising the steps of:

a. preparing a polyester melt;

b. adding a hydrogenation catalyst;

c. adding a source of reactive hydrogen; and d. forming the polyester article.

58. A method as in claim 57, wherein the polyester melt is subject to a vacuum prior to step c.

59. A method as in claim 57, wherein the polyester melt is not solidified prior to forming the polyester article.

60. A method as in claim 57, wherein the polyester article is a preform.

61. A method as in claim 57, wherein the polyester is substantially free of antimony compounds.

62. A method as in claim 57 wherein an acetaldehyde scavenger is added prior to or after step c.

* * * * *